United States Patent [19]
Bulcock

[11] Patent Number: 6,088,862
[45] Date of Patent: Jul. 18, 2000

[54] HAMMER WITH ACCESSORIES

[76] Inventor: Bruce Jefferson Bulcock, 2470 W. 215th St., Bucyrus, Kans. 66013

[21] Appl. No.: 09/073,235

[22] Filed: May 6, 1998

[51] Int. Cl.[7] ........................................................ B25D 1/04
[52] U.S. Cl. ..................................... 7/146; 7/164; 81/490; 81/177.4
[58] Field of Search ................................ 7/143, 146, 164; 81/177.4, 490; 206/377–379; 220/253

[56] References Cited

U.S. PATENT DOCUMENTS

| | | |
|---|---|---|
| 102,677 | 5/1870 | Gregory . |
| D. 303,208 | 9/1989 | Chung . |
| D. 331,690 | 12/1992 | Villarreal . |
| D. 375,033 | 10/1996 | Edwards . |
| 1,109,507 | 9/1914 | Bostock . |
| 1,419,567 | 6/1922 | Johnson . |
| 1,551,779 | 9/1925 | Anderson . |
| 3,119,424 | 1/1964 | Henry ...................................... 7/164 X |
| 3,228,720 | 1/1966 | Jordan . |
| 3,763,906 | 10/1973 | Crowder . |
| 4,181,218 | 1/1980 | Cox ..................................... 220/253 X |
| 4,332,046 | 6/1982 | Foley et al. . |
| 4,544,063 | 10/1985 | Neward ................................ 220/253 X |
| 4,581,782 | 4/1986 | Riley . |
| 5,119,521 | 6/1992 | Clontz . |
| 5,158,180 | 10/1992 | Zucker ................................ 220/253 X |
| 5,235,755 | 8/1993 | Fowler ..................................... 7/164 X |
| 5,740,706 | 4/1998 | Tseng ........................................ 81/490 |

*Primary Examiner*—James G. Smith
*Attorney, Agent, or Firm*—Litman, Kraai & Brown L.L.C.

[57] ABSTRACT

A hammer with accessories having a head, a handle, and a measuring tape. The head has a poll, a striking surface, and a claw to remove old nails and other embedded objects. The head also has a flattened top so that it may be used with a level embedded in the head parallel to the top of the head, the level being used and read by placing the top of the hammer head along a horizontal surface to be leveled. The handle is formed so that most of its volume is used for one or more storage compartments which are accessible via a slot in each of the compartment walls, the slot being opened or closed by moving an interior part of the compartment so that a matching slot is in or out or registration with the access slot. The measuring tape, which can be several feet in length is attached or incorporated into the bottom of the handle so that it unrolls perpendicular to the length of the handle.

4 Claims, 4 Drawing Sheets

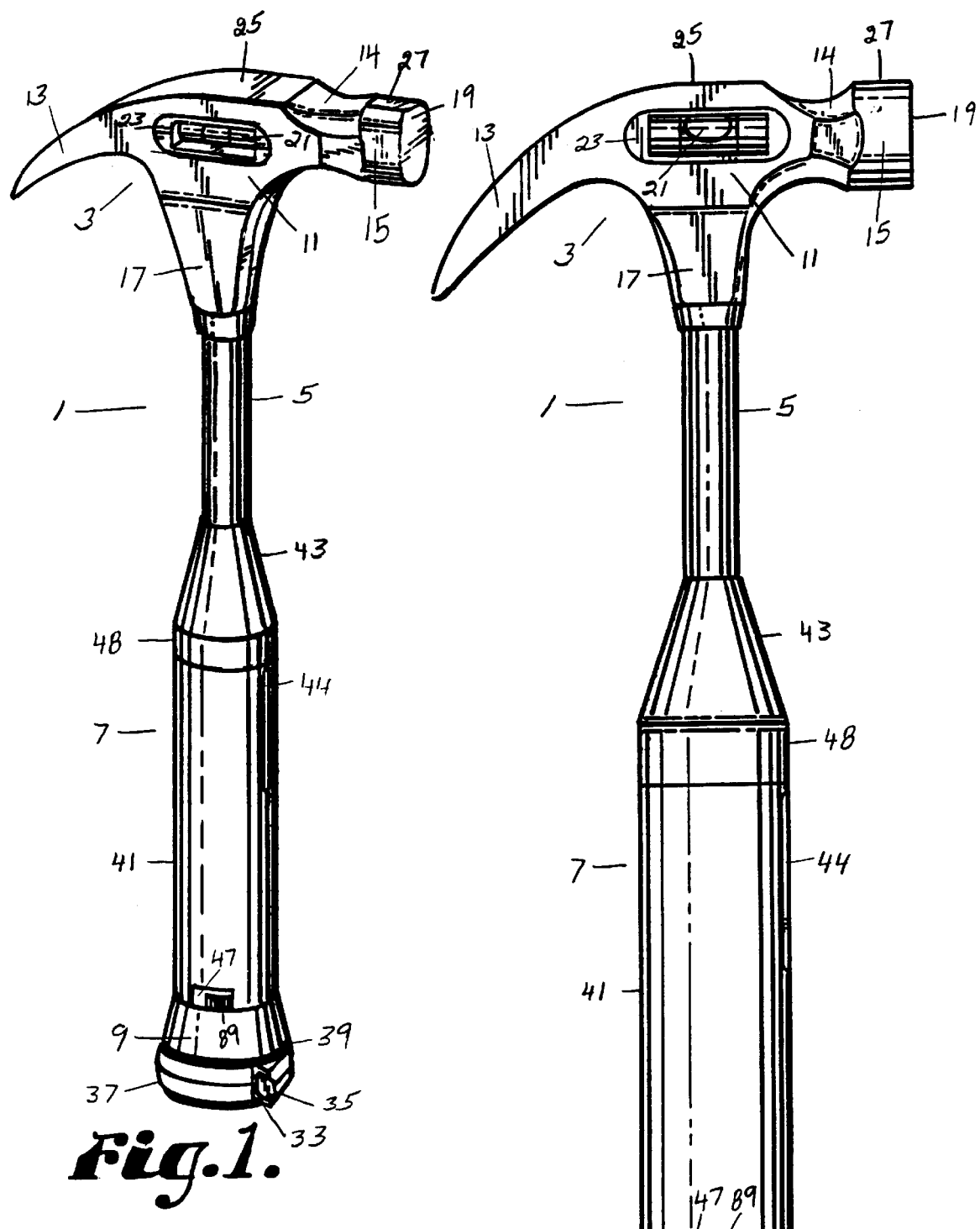
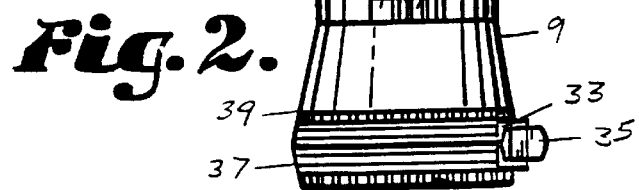

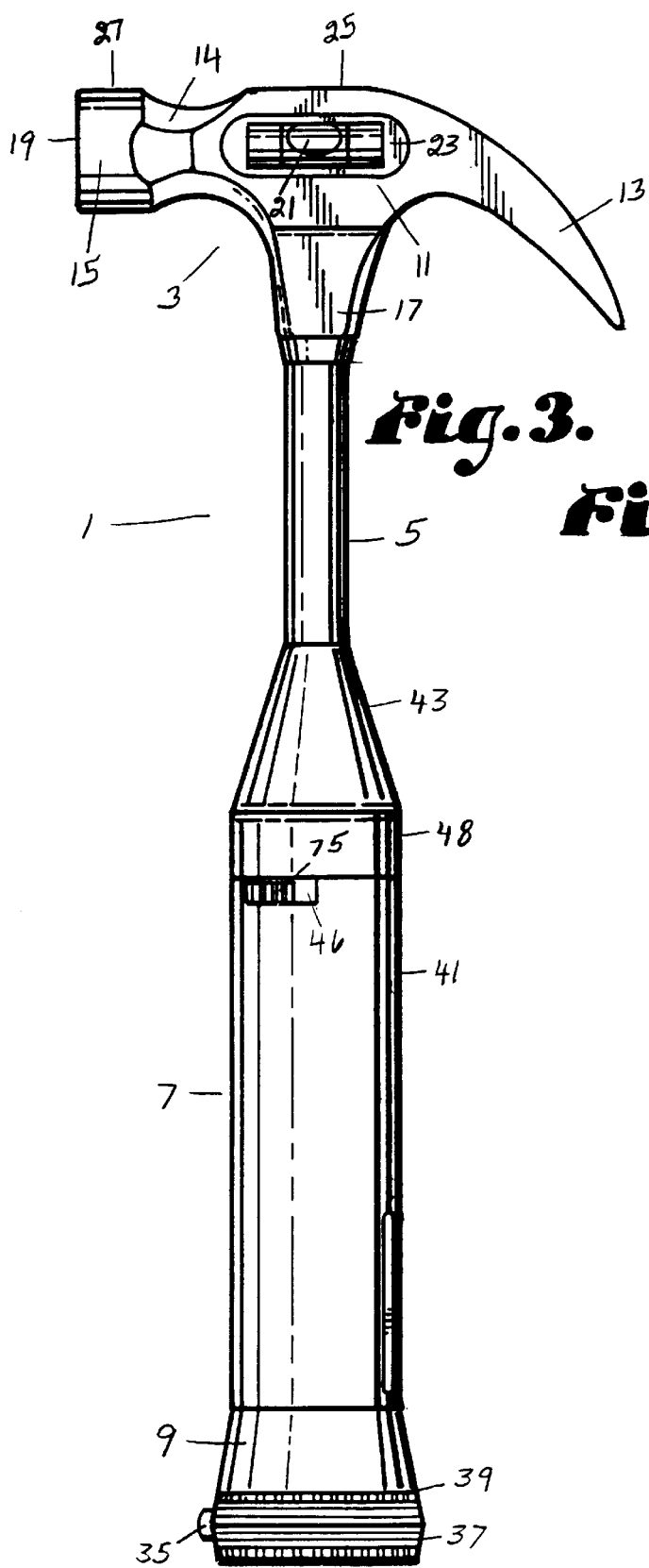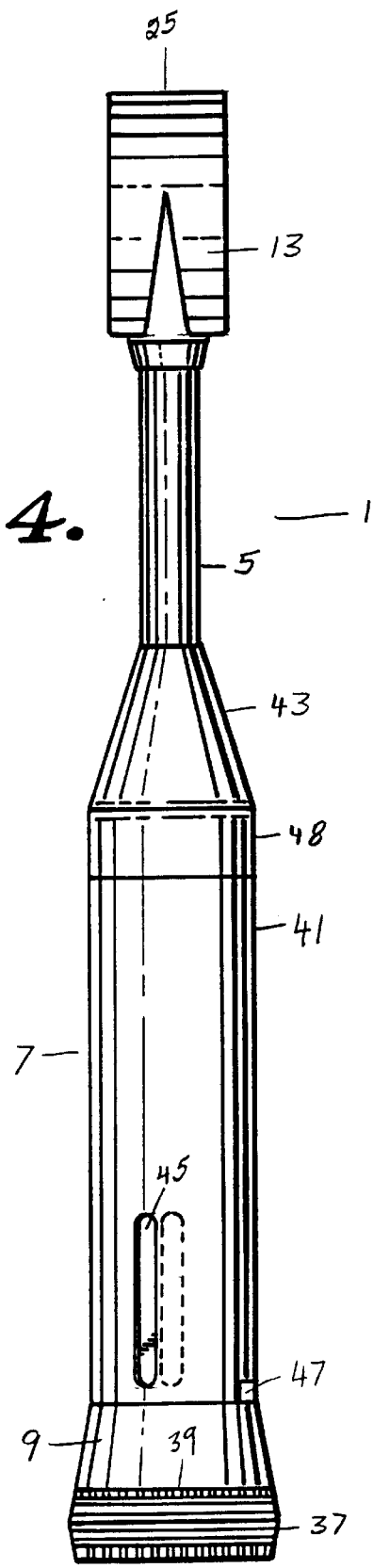

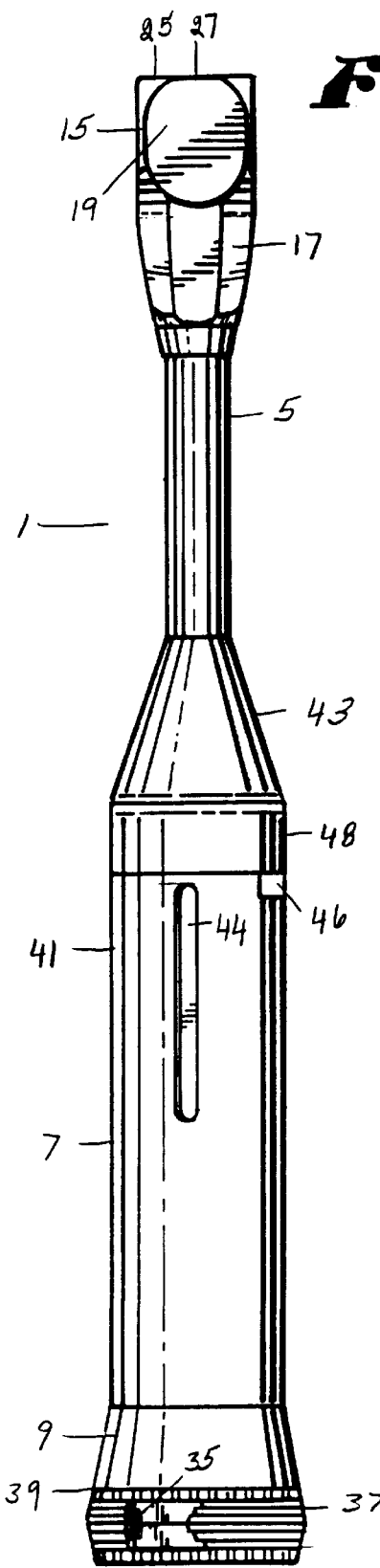
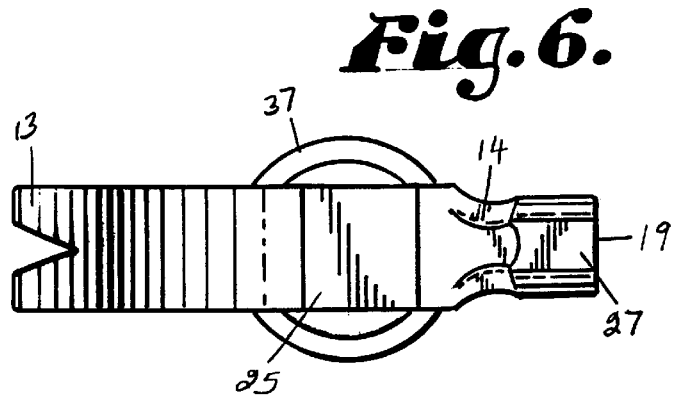
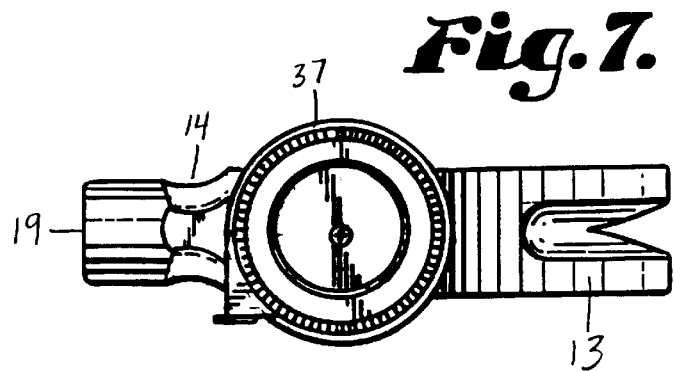

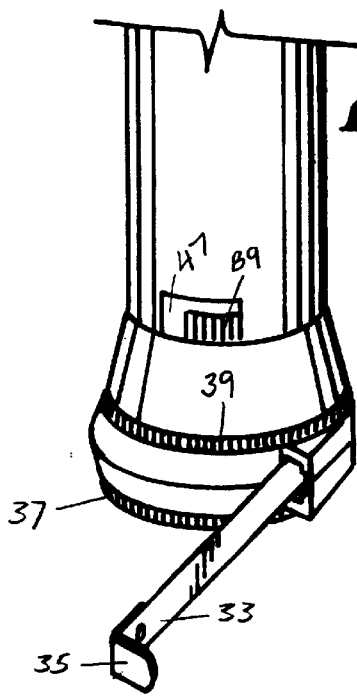
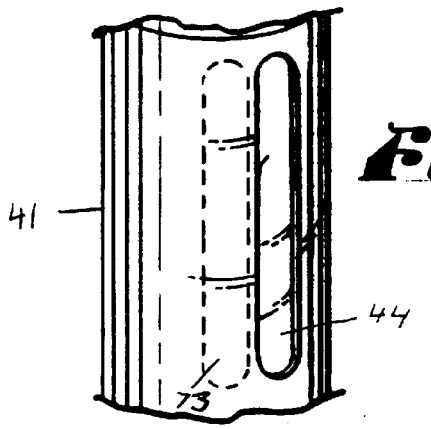
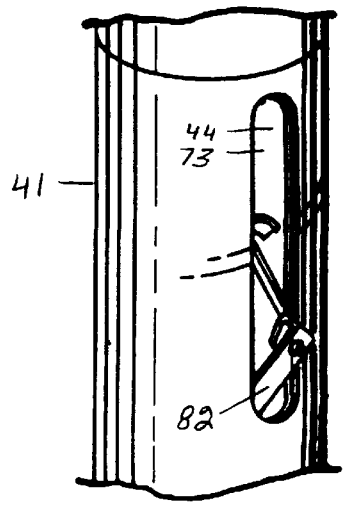
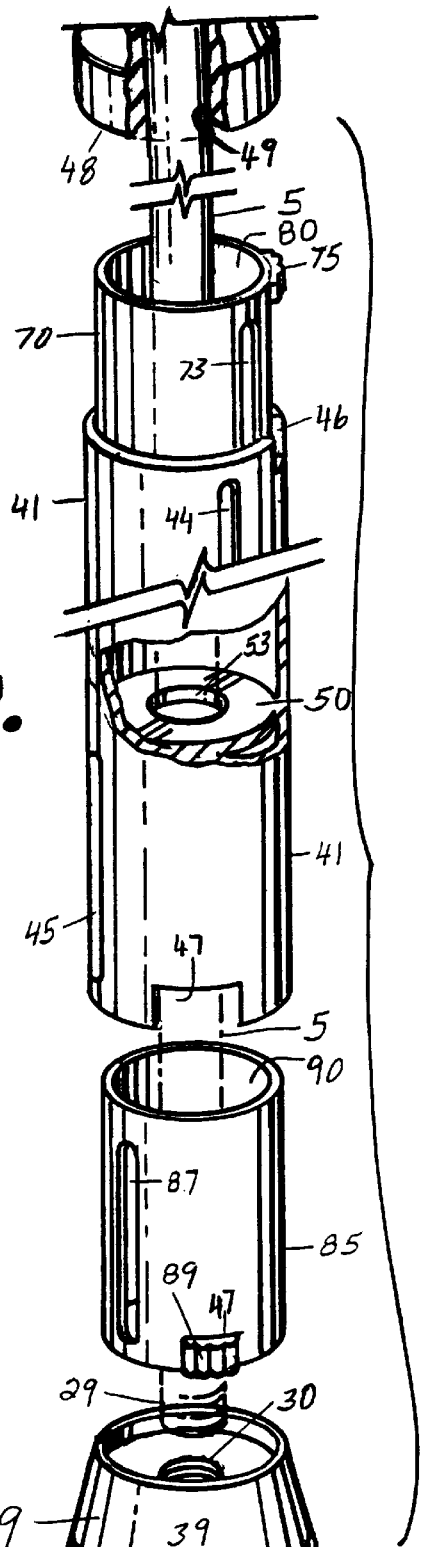
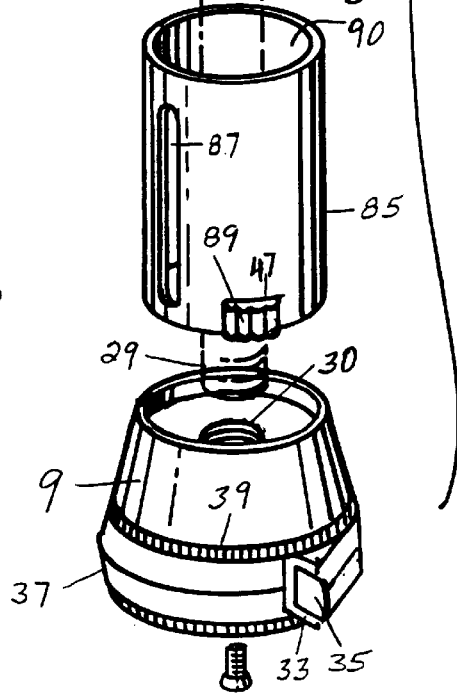

HAMMER WITH ACCESSORIES

BACKGROUND OF THE INVENTION

1. Field of the Invention

This invention is directed to a hammer for household, yard, office, and other light uses. The inventive multipurpose hammer has built-in accessories including a level, a measuring tape, and compartments to hold nails, picture hangers, tacks, brads, screws, and the like. The hammer and accessories can be used for hanging pictures and other wall hangings, as well as for repair jobs.

2. Description of the Related Art

It is frequently convenient, especially in the household or office setting, to have tools, such as hammers, that can serve more than one purpose and hold nails and other supplies which are needed for repairs or hanging pictures or wall hangings. Otherwise, the homeowner or office occupant must purchase several tools and a container, such as a toolbox, to house the tools when they are not in use and carry each of the separate tools to individual jobs.

The use of a single tool with accessories is particularly convenient when a homeowner or office occupant must perform the simple and common task of hanging pictures, certificates, and other wall hangings, or must make a minor repair to some home or office item. In such tasks, it is desirable to have a hammer to place the nail or hanger on the wall, a measuring tape to measure the height or separation of the hangings, and a level to make certain the hanging is level after it is hung on the wall. It is also desirable to have a place to store nails, hangers, and other small supplies for use in the hanging process and for use in the future. Such jobs are done relatively infrequently, and it is convenient to store the supplies where they will not be lost, but will always be available with and at the same location as the hammer and accessory tools. Incorporation of accessories in the hammer also keeps the accessories with the hammer where they are easy to transport and always available for a job.

Several attempts have been made to design a tool with accessories. One early example is U.S. Pat. No. 102,677 to Gregory which shows a handle containing a longitudinal bore for the storage of supplies or other small tools and a short ruler on the side of the hammer. In the hammer disclosed in the Gregory patent, it was necessary to screw the bottom of the handle off to gain access to the handle compartment and screw it back on to secure the items in the compartment. The ruler was, of necessity, short, because it was limited to the length of the handle.

In U.S. Pat. No. 1,109,507 to Bostock and U.S. Pat. No. Des. 331,690 to Villarreal, various slots or sockets were bored in the length of the handle to hold specific tools, such as a screw driver, a drill bit, and a saw blade, and, in U.S. Pat. No. 3,228,720 to Jordan, a magnet was placed at the end of the handle to hold nails. U.S. Pat. No. Des. 303,208 to Chung and U.S. Pat. No. 3,763,906 to Crowder disclose nail holders in the head of the hammer. In each case, the storage was limited by the design to a relatively small number of supplies.

Short rulers or gages are shown in U.S. Pat. No. 1,419,567 to Johnson, U.S. Pat. No. 1,551,779 to Anderson, U.S. Pat. No. Des. 375,033 to Edwards, and U.S. Pat. No. 3,763,906 to Crowder, and U.S. Pat. No. Des. 303,208 to Chung; however, these rulers are necessarily short, being limited to the length of the handle or an extension of the handle. U.S. Pat. No. 5,119,521 to Clontz shows a long rolled measuring tape which pulls longitudinally out of the handle, but has no other accessories.

U.S. Pat. No. 4,332,046 to Foley et al., U.S. Pat. No. 4,581,782 to Riley, U.S. Pat. No. Des. 331,690 to Villarreal, and U.S. Pat. No. 3,763,906 to Crowder show levels near the bottom of the handle of hammers. The levels are read by resting the hammer in a certain position on a surface, for example on its side or resting on the end of the poll and the end of the handle.

The above references, except Crowder, are limited to one or two accessories in addition to the hammer itself. Crowder had three accessories but, due to its design, the storage accessory is significantly limited in capacity, and the ruler accessory are in significantly limited in the lengths it can measure.

Thus, there is a need for hammer that has a level, a storage compartment or compartments for supplies, and a ruler of a longer length. The level should be usable without positioning some other portion of the hammer, such as the poll, on a surface; the level should be easier to read, easy to position, and not subject to inaccuracy due to wear or damage to other parts of the hammer, such as the poll, a frequently and heavily used part of the hammer. The storage compartment should be large enough to hold a large number of supplies such as nails and should be easily accessible; it may also be divided so that different types of supplies, such as nails and picture hangers, could be kept in separate, easily accessible areas. The ruler should be long enough to measure distances over a few inches and, preferably, up to several feet. Finally, the hammer and accessories should not be significantly larger than a typical hammer, but still contain the accessories mentioned.

SUMMARY OF THE INVENTION

The inventive hammer has a head with a poll, a striking surface, and a claw to remove old nails and other embedded objects. The head has a flattened top so that it may be used with a level embedded in the head parallel to the top of the head, the level being easily used and read by placing the top of the hammer head along the horizontal surface to be leveled. The handle is formed so that nearly all of its volume may be used for one or more storage compartments which are accessible via a slot in each of the compartment walls, the slot being opened or closed by moving an interior part of the compartment so that a matching slot is in or out or registration with the access slot. A measuring tape, which can be several feet in length is attached or incorporated into the bottom or the handle so that it unrolls perpendicular to the length of the handle.

OBJECTS AND ADVANTAGES OF THE INVENTION

The objects of the invention are to provide a durable, compact, and economical hammer with (a) several accessories, including one or more storage compartments, a level, and a tape measure; (b) several integrated accessories, so the accessories are available in one location for infrequent repairs and other light tasks such as hanging pictures and wall hangings; (c) one or more integrated storage compartments that are as large as possible without affecting the overall shape of the hammer, preferably using a substantial portion of the volume of the handle, the largest available volume for storage; (d) more than one storage compartment, so that different types of supplies can be stored and kept separate from one another; (e) easy and quick access to each storage compartment; (f) an attached or incorporated measuring tape that is substantially longer than the hammer itself and, preferably, up to several feet in length; (g) a level which can be easily read; (h) a level which can be used independently of other portions of the hammer that are subject to damage or wear which can reduce the accuracy of the level; (h) accessories of maximal capacity which are incorporated in the hammer in locations such that it is unnecessary to enlarge the hammer to accommodate the accessories, but rather, maintain the overall size of a typical hammer; and (g) parts, including accessories, which are economical to make, easy to assemble, durable, and compact.

Other objects and advantages of this invention will become apparent from the following description taken in conjunction with the accompanying drawings which set forth, by way of illustration and example, certain embodiments of this invention.

BRIEF DESCRIPTION OF THE DRAWINGS

FIG. 1 is a perspective view of a hammer and accessories showing the invention.

FIG. 2 is a right side elevational view of the hammer and accessories.

FIG. 3 is a left side elevational view of the hammer and accessories.

FIG. 4 is a rear elevational view of the hammer and accessories.

FIG. 5 is a front elevational view hammer and accessories.

FIG. 6 is a top elevational view hammer and accessories.

FIG. 7 is bottom elevational view hammer and accessories.

FIG. 8 is a fragmentary perspective view of a lower portion of a handle of the hammer showing a partially extended measuring tape.

FIG. 9 is a fragmentary and exploded perspective view of the handle of the hammer with portions broken away to show interior details.

FIG. 10 is a fragmentary perspective view of a portion of the handle of the hammer illustrating its operation.

FIG. 11 is a fragmentary perspective view of a portion of the handle of the hammer showing a picture hanger being inserted in the handle.

DETAILED DESCRIPTION OF THE INVENTION

As required, detailed embodiments of the invention are disclosed herein; however, it is to be understood that the disclosed embodiments are merely exemplary of the invention, which may be embodied in various forms. Thus, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "top," "bottom," "upper," "lower," "upward," "downward," "rightward," and "leftward" will refer to directions in the drawings to which reference is made. The words "inward" and "outward" will refer to directions toward and away from, respectively, the geometric center of the embodiment being described and designated parts thereof. Said terminology will include the words specifically mentioned, derivatives thereof, and words of a similar nature.

Hammer

FIGS. 1–3 of the drawings show a hammer 1 having a head 3, a shaft 5, a handle 7, and a base 9.

Head

The head 3 is made of a metal, such as steel, or some other solid, durable, and hard material. As best shown in FIGS. 1–4, the head 3 is of unitary construction and is formed so as to have a central body 11, a claw 13, a shaped area 14, a poll 15, a neck 17, and a striking surface 19.

Level in Head

As shown in FIGS. 1–3, a bubble-type level 21 is enclosed in a case 23, which is in turn enclosed in the central body 11 of the head 3 at the time the head 3 is formed or molded. As shown in FIGS. 1 and 3, the case 23 and the enclosed level 21 are secured in the central body 11 of the head 3 so that level 21 is visible from both sides of the head 3; however, if desired, the case 23 and the enclosed level 21 may be incorporated in the central body 11 of the head 3 so that the level 21 is visible from only one side of the head 3.

Flat Surface for Leveling

As shown in FIGS. 1–5, the head 3 is formed so that the top of the central body 11 has a flat surface 25, and the top of the poll 15 has a flat surface 27 which is parallel to and substantially even with the flat surface 25 on top of the central body 11 as shown in FIGS. 2 and 5. Although the head 3 shown in FIGS. 1 and 3 has the shaped area 13 between the central body 11 and the pole 15, the shaped area 14 may be eliminated and the head 3 formed so as to have a single, continuous, flat top surface extending from the central body 11 to the poll 15.

Shaft

The shaft 5 extends downward from the neck 17 of the head 3 of the hammer 1. The shaft 5 may be molded or formed at the same time as, and as part of, the head 3, or the shaft 5 may be made separately and attached to or within the neck 17 of the head 3. A lower end 29 of the shaft 5 is secured to the base 9. As shown in FIG. 9, the lower end 29 of the shaft 5 may be threaded and screwed into a threaded hole 30 in the base 9, or it may be permanently attached to the base 9.

Measuring Tape

As shown in FIG. 8, a measuring tape 33 having an end hook 35 is enclosed in a case 37 so that the end hook 35 may be accessed from the outside of the case 37. The case 37 is secured to a bottom 39 of the base 9 so that the measuring tape 33 may be pulled out of the case 37 generally perpendicular to the longitudinal axis of the shaft 5. The case 37 may be secured to the bottom 39 of the base 9 by a screw 40, as shown in FIG. 9, or it may be glued or otherwise attached to the bottom 39 of the base 9. Although not shown in the drawings, the case 37 containing the measuring tape 33 may also be removably attached to the bottom 39 of the base 9 so that it may be used independently of the hammer 1.

Handle

As shown in FIGS. 3 and 9, the handle 7 is formed by an outer tube 41which extends from the base 9 upward and around the shaft 5. As shown in FIG. 9, the inner diameter of the outer tube 41 is substantially larger than the outer diameter of the shaft 5 so that the outer tube 41 and the shaft 5 are spaced apart from one another. An upper portion of the outer tube 41 may be attached or matched to the shaft 5 via a tapered portion 43, as shown in FIGS. 1–5.

Openings and Tab Slots in Outer Tube of Handle

As shown in FIGS. 1, 5, and 9, the outer tube 41 forms an upper opening 44 in an upper portion of the outer tube 41 and, as shown in FIGS. 4 and 9, the outer tube 41 forms a lower opening 45 in a lower portion of the outer tube 41. As shown in FIGS. 1, 5, and 9, the outer tube 41 also forms an upper tab slot 46 in the upper portion of the outer tube 41 and, as shown in FIGS. 1–4 and 8–9, the outer tube 41 forms a lower tab slot 47 in the lower portion of the outer tube 41.

Upper Plate Inside Outer Tube of Handle

An upper plate 48 is secured or attached to and within the outer tube 41 in the upper portion of the outer tube 41, as shown in FIGS. 1–5 and 9. The upper plate 48 forms an interior hole 49 through which the shaft 5 passes. If desired, the upper plate 48 may be attached to the shaft 5 in addition to, or instead of, to the outer tube 41. In either event, the upper plate 48 should be in a fixed position in the upper portion of the outer tube 41.

Partition Plate inside Outer Tube of Handle

As shown in FIG. 9, a partition plate 50 is secured to and within the outer tube 41 so that the partition plate 50 is spaced apart from and below the upper plate 48 and spaced apart from and above the base 9. The partition plate 50 forms an interior hole 53 through which the shaft 5 passes. The partition plate 50 may be attached to the inside of the outer tube 41, or to the shaft 5, or both, in the same manner as is described in the preceding paragraph with respect to the upper plate 48.

Upper Inner Tube between Partition Plate and Upper Plate

An upper inner tube 70 is situated between the upper plate 48 and the partition plate 50 and within the outer tube 41 as shown in FIG. 9. The inner diameter of upper inner tube 70 is substantially larger than the outside diameter of the shaft 5 so that the shaft 5 and the inside of the upper inner tube 70 are spaced apart. The upper inner tube 70 is not attached to the upper plate 48 or the partition plate 50, nor is it attached to the outer tube 41. Rather, the upper inner tube 70 is allowed to rotate within the outer tube 41.

Openings and Tabs on Upper Inner Tube

The upper inner tube 70 forms an upper inner opening 73, and an upper tab 75 is attached to or formed as an extension of the upper inner tube 70 in an upper portion thereof, as shown in FIG. 9. The upper tab 75 is smaller than the upper tab slot 46 so that the upper tab 75 may be moved from side to side within the upper tab slot 46.

Cooperation and Movement of Upper Openings, Tabs, and Tab Slots

As shown in FIG. 3, the upper tab 75 is inserted through the upper tab slot 46, which is larger than the upper tab 75, so that the upper tab 75 may move from side to side within the tab slot 46 and, in so doing, cause the upper inner tube 70 to rotate within the outer tube 41. As shown in FIGS. 10 and 11, the upper opening 44 in the outer tube 41 is positioned to cooperate with the opening 73 in the upper inner tube 70 so that the upper opening 44 in the outer tube 41 is in registration with the upper inner opening 73 in the upper inner tube 70 when the upper tab 75 is moved to one side of the upper tab slot 46, and the upper opening 44 is out of registration with the upper inner opening 73 when the upper tab 75 is moved to the opposite side of the upper tab slot 46.

Upper Storage Compartment

The upper inner tube 70 forms an upper storage compartment 80, which is shown in FIG. 9. As shown in FIG. 11, objects such as nails, hangers 82, or tacks are passed through the upper opening 44 of the outer tube 41 and the upper inner opening 73 of the upper inner tube 70 when the upper opening 44 and the upper inner opening 73 are placed in registration by moving the upper tab 75 to one side of the upper tab slot 46. The objects, such as nails, hangers 82, or tacks, are secured from escaping the upper storage compartment 80 when the upper tab 75 is moved to the opposite side of the upper tab slot 46 and the upper opening 44 is out of registration with the upper inner opening 73, as shown in FIG. 10. In order to remove the nails, hangers 82, tacks, or the like, the upper tab 75 is moved back to the other side of the upper tab slot 46 so that the upper opening 44 is again in registration with the upper opening 73 and so that the nails or other objects may be removed from the upper storage compartment 80 by allowing them to pass through the registered openings 44 and 73. (See FIG. 11) Of course, nails and other objects may also be inserted into the upper storage compartment 80 when the openings 44 and 73 are in registration.

Lower Inner Tube between Partition Plate and Base

A lower inner tube 85 is situated between the base 9 and the partition plate 50 and within the outer tube 41. The inner diameter of the lower inner tube 85 is substantially larger than the outside diameter of the shaft 5 so that the shaft 5 and the inside of the lower inner tube 85 are spaced apart. The lower inner tube 85 is not attached to the base or the partition plate 50, nor is it attached to the outer tube 41. Rather, the lower inner tube 85 is allowed to rotate within the outer tube 41.

Openings and Tabs on Lower Inner Tube

The lower inner tube 85 forms a lower inner opening 87, and a lower tab 89 is attached to or formed as an extension of the lower inner tube 85 in a lower portion thereof. The lower tab 89 is smaller than the lower tab slot 47 so that the lower tab 89 may be moved from side to side within the lower tab slot 47.

Cooperation and Movement of Lower Openings, Tabs, and Tab Slots

As shown in FIG. 8, the lower tab 89 is inserted through the lower tab slot 47, which is larger than lower tab 89, so that the tab 89 may move from side to side within the tab slot 47 and, in so doing, cause the lower inner tube 85 to rotate within the outer tube 41. The lower opening 45 in the outer tube 41 is positioned to cooperate with the opening 87 in the lower inner tube 85 so that the lower opening 45 in the outer tube 41 is in registration with the lower inner opening 87 in the lower inner tube 85 when the lower tab 89 is moved to one side of the lower tab slot 47, and the lower opening 45 is out of registration with the lower inner opening 87 when the lower tab 89 is moved to the opposite side of the lower tab slot 47.

Lower Storage Compartment

The lower inner tube 85 forms a lower storage compartment 90, which is shown in FIG. 9. Objects such as nails, hangers 82, or tacks are passed through the lower opening 45 of the outer tube 41 and the lower opening 87 of the lower inner tube 85 when the lower opening 45 and the lower opening 87 are placed in registration by moving the lower tab 89 to one side of the lower tab slot 47. The objects, such as nails, hangers 82, or tacks, are secured within the lower storage compartment 90 when the lower tab 89 is moved to the opposite side of the lower tab slot 47 and the lower opening 45 in the outer tube 41 is out of registration with the lower inner opening 87 of the lower inner tube 85. (See FIG. 10.) In order to remove the nails, hangers 82, tacks or the like, the lower tab 89 is moved back to the other side of the lower tab slot 47 so that the lower opening 45 is again in registration with the lower inner opening 87, and the nails or other objects may be removed from the lower storage compartment 90 by allowing them to pass through the registered openings 45 and 87. Of course, objects may also be inserted into lower storage compartment 90 when the openings 45 and 87 are in registration.

Although FIGS. 10 and 11 are labeled to show the operation of the opening 73 in the upper inner tube 70 as it moves into and out of registration with the upper opening 44 in the outer tube 41 in response to the movement of the upper tab 75 within the upper tab slot 46 and consequent rotation of the upper inner tube 70, FIGS. 10 and 11 also illustrate the identical operation of the lower inner opening 87 in the lower inner tube 85 as it moves into and out of registration with the lower opening 45 of outer tube 41 in response to the movement of the lower tab 89 within the lower tab slot 47 so as to rotate the lower inner tube 85.

Use and Operation of Hammer and Accessories

In operation, the hammer 1 may be used to make repairs or hang pictures or other wall hangings. In the case of hanging pictures, the tape 33 is used to measure the location on the wall of the picture to be hung. If, say, nails are stored in the upper compartment 80, they may be removed by moving the upper tab 75 sideways in the upper tab slot 46. As the upper tab 75 is moved sideways in the upper tab slot 46, the upper inner tube 70 rotates within the outer tube 41 to bring the upper inner opening 73 in the upper inner tube 70 into registration with the upper opening 44 of the outer tube 41. When the openings 73 and 44 are in registration, they form a single, combined opening (See FIG. 11) through which the nails may be removed from the upper compartment 80. Upon removal of the nails, the upper tab 75 is moved sideways within upper tab slot 46 in the opposite direction from which it was moved to bring the openings 73 and 44 into registration. This movement of the upper tab 75 in the opposite direction rotates the upper inner tube 70 in the opposite direction and, as a consequence, causes the upper inner opening 73 to be moved out of registration with the opening 44. (See FIG. 10.) When the openings 73 and 44 are out of registration, there is no single, combined opening through which the nails can pass, and the nails cannot be removed from the upper compartment 80, but, rather may be stored in the upper compartment 80.

The opening and closing of the lower compartment 90 is done in the same manner as the opening and closing of the upper compartment 80. If, say, the hangers 82 are stored in the lower compartment 90, they may be removed by moving the lower tab 89 sideways in the lower tab slot 47. As the lower tab 89 is moved sideways in the lower tab slot 47, the lower inner tube 85 rotates within the outer tube 41 to bring the lower inner opening 87 into registration with the lower opening 45 of the outer tube 41. When the openings 87 and 45 are in registration, they form a single, combined opening (See FIG. 11) through which the hangers 82 may be removed from the lower compartment 90. After the hangers 82 are removed from the compartment 90, the compartment may be secured, and the hangers 82 stored therein, by moving the lower tab 89 sideways in the opposite direction within the lower tab slot 47 so as to rotate the lower inner tube 85 in the opposite direction and, thus, cause the lower inner opening 87 to move out of registration with the lower opening 45, preventing the hangers 82 from being removed from the compartment 90. (See FIG. 10.)

After the nails and hangers 82 are removed from the compartments 80 and 90, they may be driven into the wall with the hammer 1 in the usual way. The outer tube 41 serves as the handle 7 of the hammer 1. After the picture or other wall hanging is hung on the nail, the parallel, even flat surfaces 25 and 27 of the central body 11 and the poll 15, respectively, of the head 3 are placed along the lower edge of the wall hanging, and the wall hanging is leveled by orienting it such that the bubble in the level 21 is centered in the markings in level 21.

It is to be understood that while certain forms of the present invention have been illustration and described herein, it is not to be limited to the specific forms or arrangements of parts described and shown.

What is claimed is:

1. A hammer and accessories incorporated in the hammer having a head and a handle, said accessories comprising
   (a) a level contained in the head of the hammer;
   (b) at least one storage compartment inside the handle of the hammer comprising a generally cylindrical hollow storage tube rotatable disposed in the hammer handle, said storage tube and said hammer handle each having a respective single side facing access opening, said storage tube being rotatable relative to said hammer handle to bring said access openings into and out of registration to respectively permit and prevent access to an interior of said storage tube; and
   (c) a measuring tape attached to the bottom of the handle of the hammer.

2. The hammer and accessories of claim 1, wherein said measuring tape is contained in a case and said measuring tape is selectively extendable and retractable from said case perpendicularly to a longitudinal axis of said handle.

3. A hammer comprising a head and a handle; said handle including a generally cylindrical hollow storage tube rotatably disposed in said hammer handle, said storage tube and said handle each having a respective single, side facing access opening, said storage tube being rotatable relative to said handle to bring said access openings into and out of registration to respectively permit and prevent access to an interior of said storage tube.

4. A hammer comprising:
   (a) a hammer head;
   (b) a hammer handle comprising;
      (i) a generally cylindrical hollow inner tube rotatably disposed within an outer tube, said inner tube forming a storage compartment;
      (ii) said inner tube having a single, side facing compartment opening and a side facing tab, and said outer tube having a single, side facing handle opening and a side facing tab slot, said tab being disposed in and selectively moveable in said tab slot so as to selectively rotate said inner tube and said compartment opening, and
   (c) said compartment opening is selectively rotated into and out of registration with said handle opening to respectively permit or prevent access to said compartment.

* * * * *